(12) United States Patent
Kupferman

(10) Patent No.: US 7,619,841 B1
(45) Date of Patent: Nov. 17, 2009

(54) DISK DRIVE SUBTRACTING LOW FREQUENCY DISTURBANCE FROM A SERVO BURST SIGNAL

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 477 days.

(21) Appl. No.: 11/286,604

(22) Filed: Nov. 23, 2005

(51) Int. Cl.
*G11B 5/02* (2006.01)
*G11B 20/06* (2006.01)
*G11B 5/09* (2006.01)

(52) U.S. Cl. .................. 360/27; 360/29; 360/46
(58) Field of Classification Search ............ None
See application file for complete search history.

(56) References Cited

U.S. PATENT DOCUMENTS

| | | | |
|---|---|---|---|
| 5,751,510 A | 5/1998 | Smith et al. | |
| 5,801,896 A | 9/1998 | Freitas | |
| 5,818,656 A | 10/1998 | Klaassen et al. | |
| 5,852,521 A | 12/1998 | Umeyama et al. | |
| 5,898,532 A * | 4/1999 | Du et al. ................ | 360/46 |
| 5,909,332 A | 6/1999 | Spurbeck et al. | |
| 6,078,453 A | 6/2000 | Dziallo et al. | |
| 6,122,125 A | 9/2000 | Clare et al. | |
| 6,125,154 A | 9/2000 | Sutardja | |
| 6,130,791 A | 10/2000 | Muto | |
| 6,469,862 B2 | 10/2002 | Stein et al. | |
| 6,621,649 B1 | 9/2003 | Jiang et al. | |
| 6,785,085 B2 | 8/2004 | Guzik et al. | |
| 7,271,972 B1 * | 9/2007 | Pham et al. ................ | 360/75 |
| 2001/0055173 A1 | 12/2001 | Stein et al. | |
| 2002/0176192 A1 | 11/2002 | Chung | |
| 2003/0076617 A1 | 4/2003 | Nakagawa et al. | |
| 2003/0112547 A1 | 6/2003 | Koso et al. | |
| 2003/0117912 A1 | 6/2003 | Yoshimi et al. | |
| 2004/0212913 A1 | 10/2004 | Jung et al. | |
| 2005/0111125 A1 | 5/2005 | Chung | |

* cited by examiner

*Primary Examiner*—Joseph H Feild
*Assistant Examiner*—Daniell L Negrón
(74) *Attorney, Agent, or Firm*—Howard H. Sheerin, Esq.

(57) ABSTRACT

A disk drive is disclosed including a disk having a plurality of data tracks, wherein each data track comprises a plurality of data sectors and a plurality of servo sectors, and each servo sector comprises a plurality of servo bursts. A data path comprising a data decoder decodes a data read signal generated as a head passes over the data sectors, and a servo path demodulates a servo read signal generated as the head passes over the servo bursts. The servo path comprises a low pass filter operable to extract a low frequency component from the servo read signal, wherein the low pass filter does not operate on the data read signal. The servo path further comprises a subtractor operable to subtract the low frequency component from the servo read signal to generate a servo burst signal, and a servo demodulator operable to demodulate the servo burst signal.

12 Claims, 4 Drawing Sheets

DISK DRIVE SUBTRACTING LOW FREQUENCY DISTURBANCE FROM A SERVO BURST SIGNAL

BACKGROUND OF THE INVENTION

1. Field of the Invention

The present invention relates to disk drives for computer systems. More particularly, the present invention relates to a disk drive subtracting low frequency disturbance from a servo burst signal.

2. Description of the Prior Art

Disk drives for computer systems comprise a disk for storing data and a head actuated radially over the disk for writing data to and reading data from the disk. To effectuate the radial positioning of the head over the disk, the head is connected to the distal end of an actuator arm which is rotated about a pivot by a rotary actuator (e.g., a voice coil motor (VCM)). The disk is typically divided into a number of concentric, radially spaced data tracks, where each data track is divided into a number of data sectors. The disk is typically accessed a data sector at a time by positioning the head over the data track which comprises the target data sector. As the disk spins, the head writes transitions (e.g., magnetic transitions) in the data sector to record data, and during read operations senses the transitions to recover the recorded data.

Accurate reproduction of the recorded data requires the head to be positioned very close to the centerline of the target data sector during both write and read operations. Thus, accessing a target data sector involves positioning or "seeking" the head to the target data track, and then maintaining centerline "tracking" while data is written to or read from the disk. A closed loop servo system typically performs the seeking and tracking operations by controlling the rotary actuator in response to position information generated from the head.

A well known technique for generating the head position control information is to record servo information in servo sectors disbursed circumferentially about the disk, "embedded" with the data sectors. This is illustrated in FIG. 1 which shows a disk 2 comprising a number of concentric data tracks 4 and a number of embedded servo sectors $6_0$-$6_N$. Each servo sector 6; comprises a preamble 8, a sync mark 10, servo data 12, and servo bursts 14. The preamble 8 comprises a periodic pattern which allows proper gain adjustment and timing synchronization of the read signal, and the sync mark 10 comprises a special pattern for symbol synchronizing to the servo data 12. The servo data 12 comprises identification information, such as sector identification data and a track address. The servo control system reads the track address during seeks to derive a coarse position for the head with respect to the target track. The track addresses are recorded using a phase coherent Gray code so that the track addresses can be accurately detected when the head is flying between tracks. The servo bursts 14 in the servo sectors 6 comprise groups of consecutive transitions (e.g., A, B, C and D bursts) which are recorded at precise intervals and offsets with respect to the track centerline. Fine head position control information is derived from the servo bursts 14 for use in centerline tracking while writing data to and reading data from the target data track.

Any disturbance in the read signal when reading the servo bursts can induce errors in the resulting position error signal (PES) used to control the rotary actuator. For example, in certain disk drives the head may emit low frequency noise that modulates the read signal while reading the servo bursts.

There is, therefore, a need for a disk drive capable of attenuating a low frequency disturbance from the servo burst signal in a cost effective manner.

SUMMARY OF THE INVENTION

An embodiment of the present invention comprises a disk drive including a disk having a plurality of data tracks, wherein each data track comprises a plurality of data sectors and a plurality of servo sectors, and each servo sector comprises a plurality of servo bursts. The disk drive further comprises a head actuated over the disk operable to read the data sectors and servo sectors to generate read signals. A data path comprising a data decoder decodes a data read signal generated as the head passes over the data sectors, and a servo path demodulates a servo read signal generated as the head passes over the servo bursts. The servo path comprises a low pass filter operable to extract a low frequency component from the servo read signal, wherein the low pass filter does not operate on the data read signal. The servo path further comprises a subtractor operable to subtract the low frequency component from the servo read signal to generate a servo burst signal, and a servo demodulator operable to demodulate the servo burst signal.

In one embodiment, the servo path further comprises a servo burst window signal operable to enable the low pass filter and subtractor as the head passes over the servo bursts. In one embodiment, each servo sector further comprises servo data, and at least one of the low pass filter and subtractor is disabled as the head passes over the servo data.

In another embodiment, the data path further comprises a thermal asperity filter operable to attenuate a thermal asperity disturbance in the data read signal. In one embodiment, the low pass filter has a first cutoff frequency, and the thermal asperity filter has a second cutoff frequency substantially less than the first cutoff frequency.

Another embodiment of the present invention comprises control circuitry for use in a disk drive, the disk drive comprises a disk having a plurality of data tracks, wherein each data track comprises a plurality of data sectors and a plurality of servo sectors, and each servo sector comprises a plurality of servo bursts. The disk drive further comprises a head actuated over the disk operable to read the data sectors and servo sectors to generate read signals. The control circuitry comprises a data path comprising a data decoder for decoding a data read signal generated as the head passes over the data sectors, and a servo path for demodulating a servo read signal generated as the head passes over the servo bursts. The servo path comprises a low pass filter operable to extract a low frequency component from the servo read signal, wherein the low pass filter does not operate on the data read signal. The servo path further comprises a subtractor operable to subtract the low frequency component from the servo read signal to generate a servo burst signal, and a servo demodulator operable to demodulate the servo burst signal.

Another embodiment of the present invention comprises a method of operating a disk drive, the disk drive comprising a disk having a plurality of data tracks, wherein each data track comprises a plurality of data sectors and a plurality of servo sectors, and each servo sector comprises a plurality of servo bursts. The disk drive further comprises a head actuated over the disk operable to read the data sectors and servo sectors to generate read signals. The method comprises the steps of decoding a data read signal generated as the head passes over the data sectors, and extracting a low frequency component from a servo read signal generated as the head passes over the servo bursts, wherein the step of extracting does not operate on the data read signal. The method further comprises the steps of subtracting the low frequency component from the servo read signal to generate a servo burst signal, and demodulating the servo burst signal.

DESCRIPTION OF THE PREFERRED EMBODIMENTS

Figure 1:
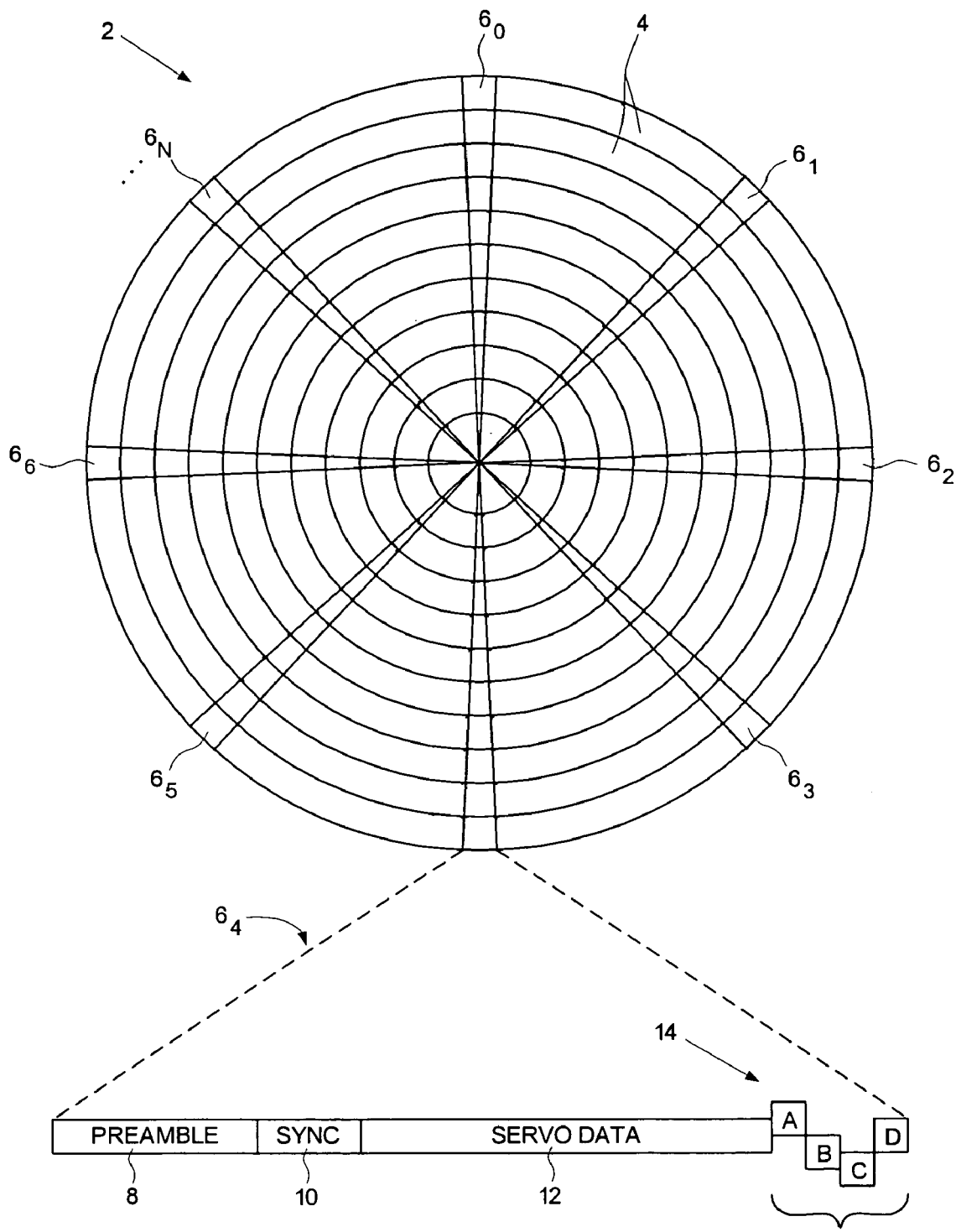
FIG. 1 shows a prior art format of a disk comprising a plurality of radially spaced, concentric data tracks, and embedded servo sectors comprising a plurality of servo bursts.
Figure 2A:
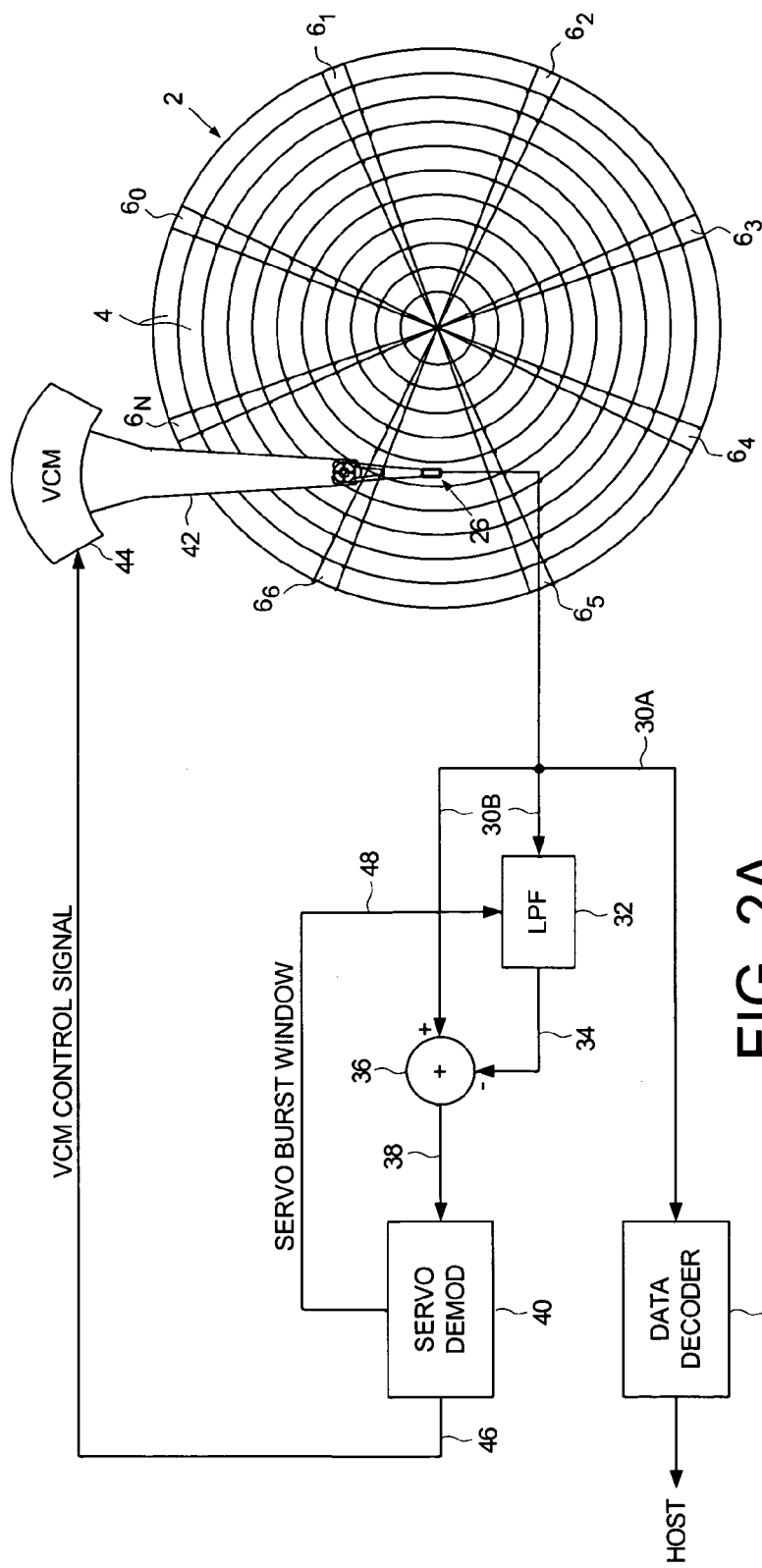
FIG. 2A shows a disk drive according to an embodiment of the present invention comprising a data path and a servo path, wherein the servo path subtracts a low frequency disturbance from the servo read signal representing the servo bursts.

FIG. 2A shows a disk drive according to an embodiment of the present invention comprising a disk 2 having a plurality of data tracks 4, wherein each data track 4 comprises a plurality of data sectors and a plurality of servo sectors $6_0$-$6_N$, and each servo sector $6_i$ comprises a plurality of servo bursts 14 (shown in FIG. 1). The disk drive further comprises a head 26 actuated over the disk 2 operable to read the data sectors and servo sectors $6_0$-$6_N$ to generate read signals. A data path comprising a data decoder 28 decodes a data read signal 30A generated as the head 26 passes over the data sectors, and a servo path demodulates a servo read signal 30B generated as the head 26 passes over the servo bursts 14. The servo path comprises a low pass filter 32 operable to extract a low frequency component 34 from the servo read signal 30B, wherein the low pass filter 32 does not operate on the data read signal 30A. The servo path further comprises a subtractor 36 operable to subtract the low frequency component 34 from the servo read signal 30B to generate a servo burst signal 38, and a servo demodulator 40 operable to demodulate the servo burst signal 38.

In the embodiments of the present invention, the term "path" refers to the communication channel from the head 26, which generates read signals, to the components along the data path and servo path that process the data read signal 30A and servo read signal 30B, respectively.

In the embodiment of FIG. 2A, the head 26 is attached to a distal end of an actuator arm 42 which is rotated about a pivot by a voice coil motor (VCM) 44 in order to position the head 26 radially over the disk 2. The servo demodulator 40 generates a VCM control signal 46 applied to the VCM 44 in order to maintain the head 26 over a centerline of a target data track during read/write operations. During read operations, the data read signal is generated as the head 26 passes over the target data sectors and transduces the magnetic transitions representing recorded user data, and the servo read signal is generated as the head 26 passes over the embedded servo sectors $6_0$-$6_N$ and transduces the magnetic transitions representing the servo data 12 and the servo bursts 14.

Figure 3A:
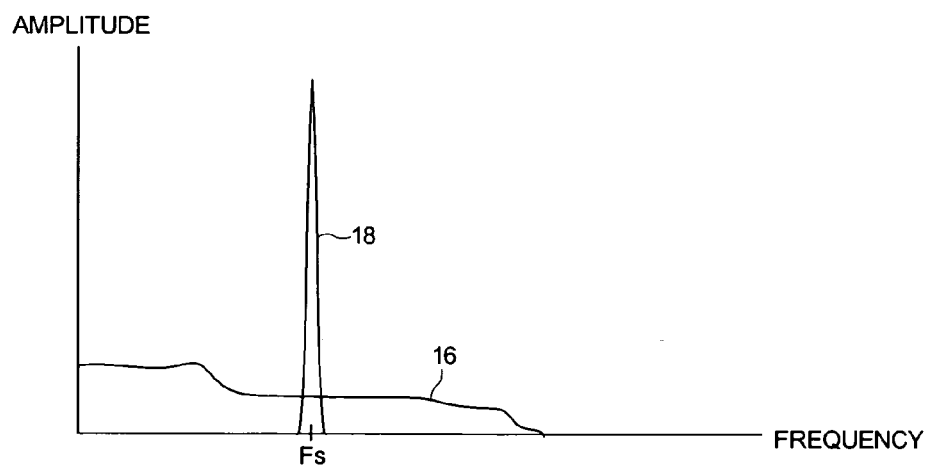
FIGS. 3A-3C illustrate the low frequency disturbance being subtracted from the servo read signal representing the servo bursts.
Figure 3B:
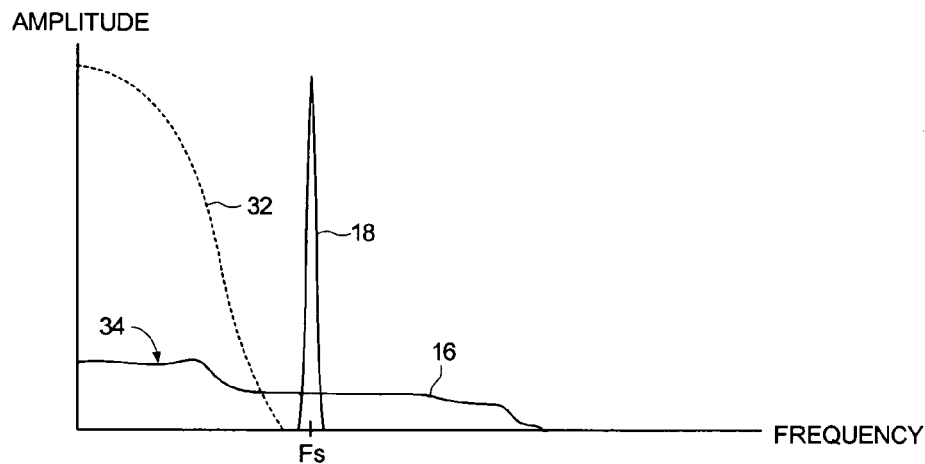
Figure 3C:
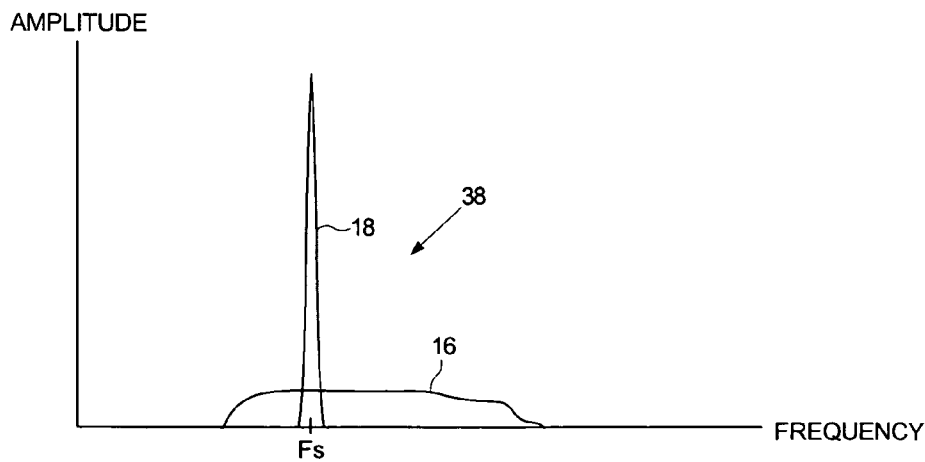

FIGS. 3A-3C illustrate operation of the servo path of FIG. 2A wherein FIG. 3A shows the spectrum of the servo read signal 30B including a noise signal 16 and the tone 18 of the servo burst signal at frequency Fs. FIG. 3B illustrates operation of the low pass filter 32 which extracts the low frequency component 34 of the noise signal 16 from the servo read signal 30B, and FIG. 3C illustrates operation of the subtractor 36 which subtracts the low frequency component 34 from the servo read signal 30B to generate the servo burst signal 38 demodulated by the servo demodulator 40.

In one embodiment, the low pass filter 32 comprises a gradual roll-off so as to reduce its cost and complexity. In addition, the bandwidth of the low pass filter 32 may be selected so that it has substantially no affect on the tone 18 of the servo burst signal, regardless of the frequency Fs of the tone 18. This enables the frequency Fs of the tone 18 to be adjusted, for example between disk drive production lines, without needing to change the low pass filter 32. This is illustrated in FIGS. 3B-3C wherein the frequency Fs can be increased while still attenuating the low frequency component 34 of the noise signal 16.

The low pass filter 32 may be implemented using any suitable technique. In one embodiment, the low pass filter 32 operates in the analog domain using analog circuitry, and in an alternative embodiment, the servo read signal 30B is sampled, and the low pass filter 32 operates in discrete time using discrete time circuitry. In yet another embodiment, the servo read signal 30B is digitized, and the low pass filter 32 is implemented in firmware executed by a microprocessor. The subtractor 36 may also operate in the analog domain or discrete time, and may also be implemented in firmware.

Any suitable circuitry may be used to implement the servo demodulator 40, such as with dedicated analog or discrete time circuitry, or in firmware executed by a microprocessor. In one embodiment, the servo demodulator 40 comprises an integrator for integrating the servo burst signal 38, and in one embodiment, for generating a plurality of integrated signals representing respective servo bursts (e.g., A, B, C, D of FIG. 1). The integrated signals representing the servo bursts are compared using any suitable algorithm in order to generate a position error signal (PES) used to generate the VCM control signal 46. However, any suitable demodulation algorithm may be employed, such as using a discrete Fourier transform (DFT) or the coordinate rotation digital computer (CORDIC).

Any suitable circuitry may be used to implement the data decoder 28, such as with dedicated analog or discrete time circuitry, or in firmware executed by a microprocessor. The data decoder 28 may also implement any suitable data decoding algorithm, such as Viterbi decoding, Turbo decoding, and the like. With these types of "partial response maximum likelihood" decoding algorithms, the data path typically comprises other suitable components (not shown) such as a sampling device for sampling the data read signal 30A, as well as timing recovery, gain control, and equalizing components which may be implemented in hardware or firmware. In one embodiment, the bandwidth of the low pass filter 32 extends well into the bandwidth of the data read signal, but not into the tone 18 of the servo burst signal. However, because the low pass filter 32 is not included in the data path, it has no affect on the data read signal 30A or the reliability of the data decoder 28.

In a preferred embodiment, the circuitry illustrated generally in FIG. 2A, and discussed at length above, comprises control circuitry capable of performing the steps discussed herein. However, in other embodiments, it will be well understood that any suitable control circuitry may be employed. For example, in one embodiment, the control circuitry may comprise digital circuitry integrated on a system on a chip (SOC). In another embodiment, the control circuitry may comprise analog or discrete time circuitry.

Figure 2B:
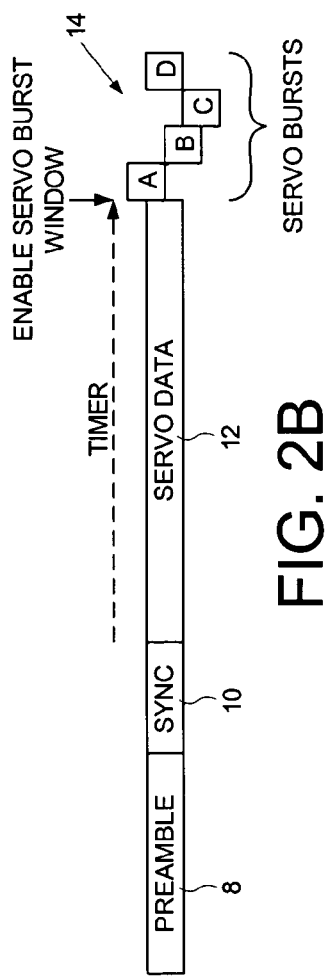
FIG. 2B shows an embodiment of the present invention wherein a servo burst window is enabled relative to the servo sync mark.

In one embodiment, the servo path further comprises a servo burst window signal 48 operable to enable the low pass filter 32 and subtractor 36 as the head 26 passes over the servo bursts of a servo sector $6_i$. In this manner, the low frequency component 34 of the noise signal 16 is attenuated only while reading the servo bursts. In another embodiment, each servo sector $6_i$ further comprises servo data 12 (FIG. 1) such as a track address, and at least one of the low pass filter 32 and subtractor 36 is disabled as the head 26 passes over the servo data 12. In this manner, the low pass filter 32 does not adversely affect the data decoding algorithm used to decode the servo data 12. In an embodiment shown in FIG. 2B, the servo burst window signal 48 is enabled relative to when the sync mark 8 in each servo sector $6_i$ is detected. For example, the servo demodulator 40 may comprise a timer that is enabled by a sync mark detector, wherein the timer is clocked by a data clock synchronized to the data rate of the servo data 12. The servo burst window signal 48 is enabled when the timer indicates that the head 26 has reached the end of the servo data 12 as shown in FIG. 2B.

Figure 4:
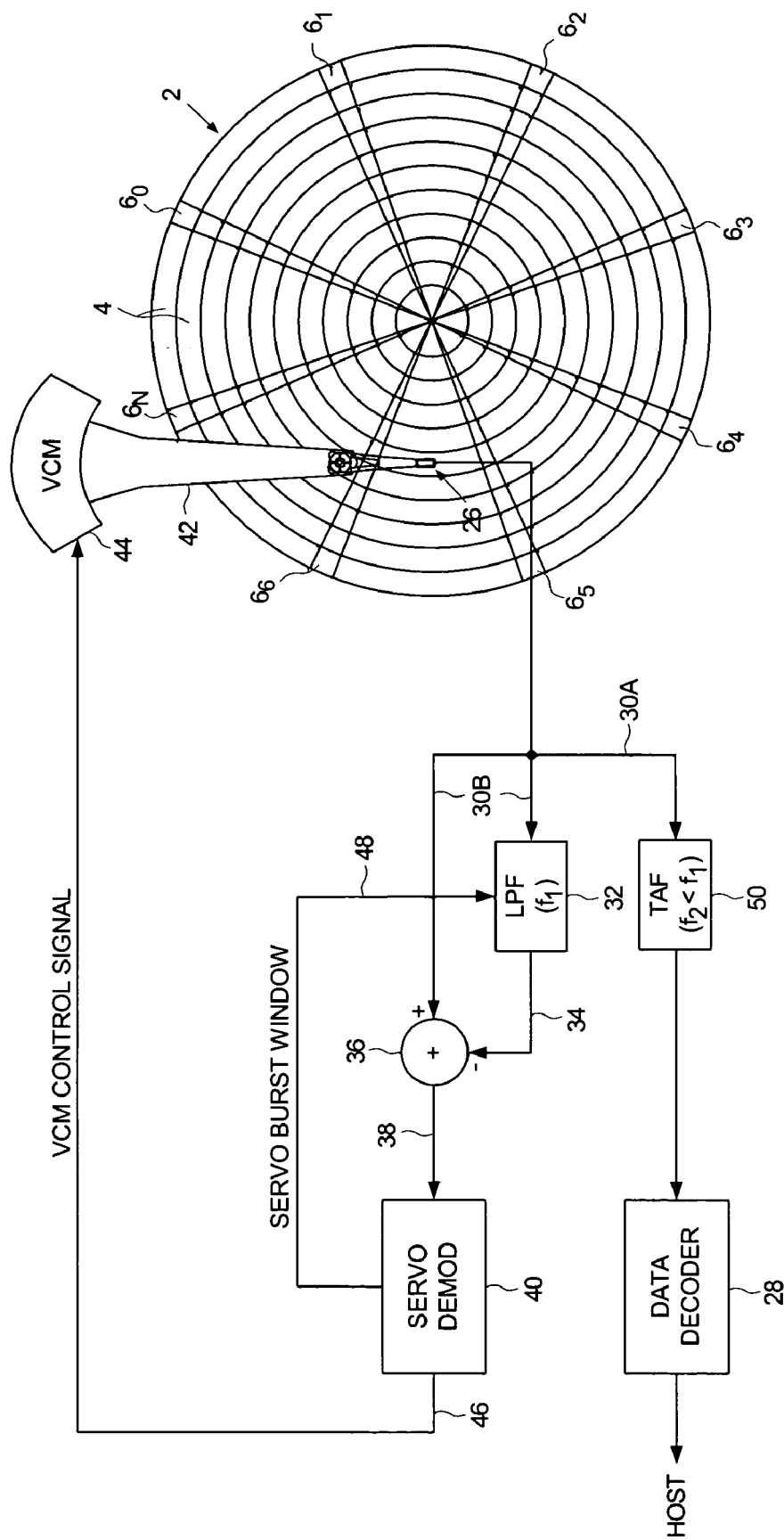
FIG. 4 shows a disk drive according to an embodiment of the present invention wherein the data path comprises a thermal asperity filter for attenuating a thermal asperity disturbance in the data read signal.

FIG. 4 shows a disk drive according to another embodiment of the present invention wherein the data path further comprises a thermal asperity filter 50 operable to attenuate a thermal asperity disturbance in the data read signal 30A while reading the data sectors. A thermal asperity is an aberration wherein the head 26 physically strikes an asperity on the disk 2 causing the temperature of the head 26 to spike and then decrease exponentially. With certain heads, such as with magnetoresistive (MR) heads, a thermal asperity causes a corresponding spike in the data read signal 30A which also decreases exponentially with the temperature of the head. A thermal asperity filter 50 helps attenuate the low frequency disturbance caused by a thermal, asperity without adversely affecting the reliability of the data decoder 28. The thermal asperity filter 50 may comprise any suitable circuitry, such as a high pass filter implemented in hardware (analog or discrete time circuitry) or firmware. As described below, in one embodiment the thermal asperity filter 50 is programmable so that its cutoff frequency can be increased during a thermal asperity event.

In one embodiment, the thermal asperity filter has a cutoff frequency that is substantially less than the cutoff frequency of the low pass filter 32 so as to not degrade the performance of the data decoder 28 during normal operating conditions (thermal asperity not present). In one embodiment, when a thermal asperity is detected, the cutoff frequency of the thermal asperity filter 50 is increased for the duration of the thermal asperity event to attenuate the low frequency disturbance until it decays below a predetermined threshold. Once the thermal asperity event passes, the cutoff frequency of the thermal asperity filter 50 is reduced to the normal operating condition so as to not degrade the reliability of the data decoder 28.

I claim:

1. A disk drive comprising:
   (a) a disk comprising a plurality of data tracks, wherein:
       each data track comprises a plurality of data sectors and a plurality of servo sectors; and
       each servo sector comprises a plurality of servo bursts;
   (b) a head actuated over the disk operable to read the data sectors and servo sectors to generate read signals;
   (c) a data path comprising a data decoder operable to decode a data read signal generated as the head passes over the data sectors; and
   (d) a servo path comprising:
       a low pass filter operable to extract a low frequency component from a servo read signal generated as the head passes over the servo bursts, wherein the low pass filter does not operate on the data read signal;
       a subtractor operable to subtract the low frequency component from the servo read signal to generate a servo burst signal;
       a servo demodulator operable to demodulate the servo burst signal; and
       a servo burst window signal operable to enable the low pass filter and subtractor as the head passes over the servo bursts.

2. The disk drive as recited in claim 1, wherein:
   (a) each servo sector further comprises servo data; and
   (b) at least one of the low pass filter and subtractor is disabled as the head passes over the servo data.

3. The disk drive as recited in claim 1, wherein the data path further comprises a thermal asperity filter operable to attenuate a thermal asperity disturbance in the data read signal.

4. The disk drive as recited in claim 3, wherein:
   (a) the low pass filter has a first cutoff frequency; and
   (b) the thermal asperity filter has a second cutoff frequency substantially less than the first cutoff frequency.

5. Control circuitry for use in a disk drive, the disk drive comprising a disk having a plurality of data tracks, wherein each data track comprises a plurality of data sectors and a plurality of servo sectors, and each servo sector comprises a plurality of servo bursts, and a head actuated over the disk operable to read the data sectors and servo sectors to generate read signals, the control circuitry comprising:
   (a) a data path comprising a data decoder operable to decode a data read signal generated as the head passes over the data sectors; and
   (b) a servo path comprising:
       a low pass filter operable to extract a low frequency component from a servo read signal generated as the head passes over the servo bursts, wherein the low pass filter does not operate on the data read signal;
       a subtractor operable to subtract the low frequency component from the servo read signal to generate a servo burst signal;
       a servo demodulator operable to demodulate the servo burst signal; and
       a servo burst window signal operable to enable the low pass filter and subtractor as the head passes over the servo bursts.

6. The control circuitry as recited in claim 5, wherein:
   (a) each servo sector further comprises servo data; and
   (b) at least one of the low pass filter and subtractor is disabled as the head passes over the servo data.

7. The control circuitry as recited in claim 5, wherein the data path further comprises a thermal asperity filter operable to attenuate a thermal asperity disturbance in the data read signal.

8. The control circuitry as recited in claim 7, wherein:
   (a) the low pass filter has a first cutoff frequency; and
   (b) the thermal asperity filter has a second cutoff frequency substantially less than the first cutoff frequency.

9. A method of operating a disk drive, the disk drive comprising a disk having a plurality of data tracks, wherein each data track comprises a plurality of data sectors and a plurality of servo sectors, and each servo sector comprises a plurality of servo bursts, and a head actuated over the disk operable to read the data sectors and servo sectors to generate read signals, the method comprising the steps of:
   (a) decoding a data read signal generated as the head passes over the data sectors;

(b) extracting a low frequency component from a servo read signal generated as the head passes over the servo bursts, wherein the step of extracting does not operate on the data read signal;
(c) subtracting the low frequency component from the servo read signal to generate a servo burst signal;
(d) demodulating the servo burst signal; and
(e) enabling the extracting and subtracting steps as the head passes over the servo bursts.

10. The method as recited in claim 9, wherein:
(a) each servo sector further comprises servo data; and
(b) at least one of the steps of extracting and subtracting is disabled as the head passes over the servo data.

11. The method as recited in claim 9, further comprising the step of attenuating a thermal asperity disturbance in the data read signal.

12. The method as recited in claim 11, wherein:
(a) the step of extracting the low frequency component from the servo read signal occurs at a first cutoff frequency; and
(b) the step of attenuating the thermal asperity disturbance in the data read signal occurs at a second cutoff frequency substantially less than the first cutoff frequency.

* * * * *